(12) United States Patent
Leung et al.

(10) Patent No.: US 11,570,256 B1
(45) Date of Patent: Jan. 31, 2023

(54) METHOD AND SYSTEM FOR FACILITATING ELECTRONIC CLIENT INTERACTIONS

(71) Applicant: JPMorgan Chase Bank, N.A., New York, NY (US)

(72) Inventors: Willa Leung, East Brunswick, NJ (US); Adeel A Khan, Monmouth Junction, NJ (US); Robert C Buchser, Blacklick, OH (US); Kavitha Neelapu, Bellaire, TX (US); Sharmini Ilankovan, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/445,452

(22) Filed: Aug. 19, 2021

(51) Int. Cl.
*H04L 67/141* (2022.01)
*H04L 67/75* (2022.01)

(52) U.S. Cl.
CPC ............ *H04L 67/141* (2013.01); *H04L 67/75* (2022.05)

(58) Field of Classification Search
CPC .............................. H04L 67/141; H04L 67/36
See application file for complete search history.

(56) References Cited

U.S. PATENT DOCUMENTS

| | | | | |
|---|---|---|---|---|
| 9,785,715 | B1* | 10/2017 | Busey | G06N 5/02 |
| 11,055,152 | B1* | 7/2021 | Sohrweide | G06F 9/542 |
| 11,178,282 | B1* | 11/2021 | Ramachandran | H04M 3/5175 |
| 2002/0059204 | A1* | 5/2002 | Harris | G06F 16/24522 |
| 2006/0173824 | A1* | 8/2006 | Bensky | G06Q 10/107 |
| 2015/0381674 | A1* | 12/2015 | Klemm | H04L 65/65 |
| | | | | 709/203 |
| 2016/0269504 | A1* | 9/2016 | Johar | H04L 67/141 |
| 2017/0126811 | A1* | 5/2017 | Picciotto | H04L 63/102 |
| 2018/0331980 | A1* | 11/2018 | Jernström | H04L 67/146 |
| 2020/0244612 | A1* | 7/2020 | Weldemariam | H04L 51/226 |
| 2020/0380468 | A1* | 12/2020 | Crawford | H04L 67/55 |
| 2020/0387550 | A1* | 12/2020 | Cappetta | H04L 51/02 |
| 2021/0044630 | A1* | 2/2021 | Gutta | H04L 65/1069 |
| 2021/0056172 | A1* | 2/2021 | Bastide | G06K 9/6215 |
| 2021/0232644 | A1* | 7/2021 | Shah | H04L 67/01 |

FOREIGN PATENT DOCUMENTS

JP 2018518864 A * 7/2018 ........... H04L 67/141

* cited by examiner

*Primary Examiner* — Alina A Boutah
(74) *Attorney, Agent, or Firm* — Greenblum & Bernstein, P.L.C.

(57) ABSTRACT

A method for providing an integrated platform to facilitate electronic communication is provided. The method includes receiving a communication request from a client, the communication request relating to a request to initiate a communication session with a participant; parsing the communication request to locate an identifier that corresponds to the client; retrieving, in real-time, information that is associated with the identifier; generating a graphical element, the graphical element including the retrieved information; notifying the participant of the communication request; and displaying, via a graphical user interface, the generated graphical element in real-time for the participant.

16 Claims, 9 Drawing Sheets

600

| ☏ C2C - CALL IN PROGRESS | 📞 CONNECTED - 1m 2s | PRIOR DAY 5.1K | MTD 15.1K -9% | YTD 245.2K -9% |

X-BORDER IMPLICATIONS MAY APPLY ⓘ   15A.6 MAJOR US

LIKELY MATCH

GREGORY
CAPITAL LLP
(ICM) (G) (E) (M) (F) (P) (X)

RESEARCH READERSHIP (LAST 10 DAYS)

DAVID — OPENED 2D AGO
SYSTEMS, INC.: SOLID F1Q RESULTS, CONSERVATIVE GUIDANCE UNCHANGED; MAINTAIN OVERWEIGHT

DAVID — OPENED 4D AGO
: SALES WARNING, FY17 LFL TARGET CUT TO 2%

DAVID — OPENED 10D AGO
SUMMER 2017 EUROPEAN CREDIT COVERAGE AND RATING REPORT: A SUMMARY OF ANALYST VIEWS OF EUROPEAN ISSUERS

A BRIEF CALL WITH GREGORY

SOME ADDITIONAL NOTES AND INTERACTION DETAILS FROM THE CALL WOULD GO HERE.

NEXT MEETING

HEALTHCARE CONFERENCE
TOMORROW 1:00-2:00 PM WITH YOU AND KEVIN +11
ⓘ YOU HAVE A MEETING WITH GREG IN 3 DAYS

☐ NO TICKER DISCUSSED      ☑ COVERED (TECH ×)

LAST INTERACTION (EXCLUDING EMAILS)

📧 DISCUSS Q4 EARNING
INTERESTED IN SHARE BLOCK OF BUT ONLY IF WE CAN GET THE DEAL TOGETHER BEFORE THE END OF THE MONTH. 3 DAYS AGO WITH PAUL +2
ⓘ YOU CALLED GREG 3 DAYS AGO

ENTER TAGS HERE (A ×) (N ×) (AUTO ×)      [LOG INTX]

METHOD AND SYSTEM FOR FACILITATING ELECTRONIC CLIENT INTERACTIONS

BACKGROUND

1. Field of the Disclosure

This technology generally relates to methods and systems for facilitating client interactions, and more particularly to methods and systems for providing an integrated platform that manages client data for inbound and outbound electronic communications to facilitate effective client interactions.

2. Background Information

Many business entities rely on successful management of client relationships to effectively provide goods and services. Often, successful management of client relationships depend on utilization of client data by employees. For large businesses, available information for each client may include large volumes of data that are located in different repositories and data platforms. Historically, implementation of conventional client relationship management techniques to manage client relationships have resulted in varying degrees of success with respect to providing necessary client information to appropriate employees at proper times.

One drawback of using conventional client relationship management techniques is that in many instances, pertinent client data are not readily available for the employees when the client data are needed. For example, when an employee receives a call from a particular client, the employee does not have information for the particular client and thus, participates in the call unprepared. Additionally, since the client data may be stored in several different platforms, the employee may overlook pertinent events such as, for example, an upcoming scheduled meeting with the particular client.

Therefore, there is a need for an integrated platform that manages client data for inbound and outbound electronic communications to facilitate effective client relationship management.

SUMMARY

The present disclosure, through one or more of its various aspects, embodiments, and/or specific features or sub-components, provides, inter alia, various systems, servers, devices, methods, media, programs, and platforms for providing an integrated platform that manages client data for inbound and outbound electronic communications to facilitate effective client interactions.

According to an aspect of the present disclosure, a method for providing an integrated platform to facilitate electronic communication is disclosed. The method is implemented by at least one processor. The method may include receiving at least one communication request from at least one client, the at least one communication request may relate to a request to initiate a communication session with at least one participant; parsing the at least one communication request to locate at least one identifier that corresponds to the at least one client; retrieving, in real-time, information that is associated with the at least one identifier; generating at least one graphical element, the at least one graphical element may include the retrieved information; notifying the at least one participant of the at least one communication request; and displaying, via a graphical user interface, the at least one generated graphical element in real-time for the at least one participant.

In accordance with an exemplary embodiment, the method may further include receiving an indication from the at least one participant via the graphical user interface, the indication may correspond to an acceptance of the at least one communication request; and automatically initiating the communication session based on at least one parameter from the at least one communication request.

In accordance with an exemplary embodiment, the method may further include logging, in real-time using natural language processing, the at least one communication request together with session information that corresponds to the automatically initiated communication session; determining, by using the log, whether the automatically initiated communication session satisfies a predetermined business guideline; and notifying the at least one participant when the automatically initiated communication session does not satisfy a predetermined business guideline.

In accordance with an exemplary embodiment, the method may further include transcribing, in real-time using natural language processing, the automatically initiated communication session; determining, by using sentiment analysis and the transcript, at least one client sentiment for the automatically initiated communication session; and associating the determined at least one client sentiment with the automatically initiated communication session.

In accordance with an exemplary embodiment, the at least one client sentiment may include a characteristic that relates to at least one from among a level of satisfaction and a level of interest for a financial product.

In accordance with an exemplary embodiment, the natural language processing may be implemented by using a model that may include at least one from among a machine learning model, a mathematical model, a process model, and a data model.

In accordance with an exemplary embodiment, the at least one communication request may include a request to initiate at least one from among an audio communication, a video communication, and a textual communication.

In accordance with an exemplary embodiment, the information that is associated with the at least one identifier may include data that corresponds to at least one from among a name, a company, a tier, a past interaction, and a scheduled interaction, the scheduled interaction data including a calendar of upcoming events.

In accordance with an exemplary embodiment, the method may further include automatically compiling data from at least one source, the at least one source may include a client database; identifying client information for each of the at least one client from the compiled data, the client information may include corresponding contact information; updating the at least one graphical element based on the identified client information; and displaying, via the graphical user interface, the at least one graphical element for the at least one participant.

In accordance with an exemplary embodiment, the at least one graphical element may include a client relationship management interface that is configured to receive an input from the at least one participant to initiate an outbound communication session based on the contact information.

According to an aspect of the present disclosure, a computing device configured to implement an execution of a method for providing an integrated platform to facilitate electronic communication is disclosed. The computing device comprising a processor; a memory; and a communication interface coupled to each of the processor and the memory, wherein the processor may be configured to receive at least one communication request from at least one client, the at least one communication request may relate to a request to initiate a communication session with at least one participant; parse the at least one communication request to locate at least one identifier that corresponds to the at least one client; retrieve, in real-time, information that is associated with the at least one identifier; generate at least one graphical element, the at least one graphical element may include the retrieved information; notify the at least one participant of the at least one communication request; and display, via a graphical user interface, the at least one generated graphical element in real-time for the at least one participant.

In accordance with an exemplary embodiment, the processor may be further configured to receive an indication from the at least one participant via the graphical user interface, the indication may correspond to an acceptance of the at least one communication request; and automatically initiate the communication session based on at least one parameter from the at least one communication request.

In accordance with an exemplary embodiment, the processor may be further configured to log, in real-time using natural language processing, the at least one communication request together with session information that corresponds to the automatically initiated communication session; determine, by using the log, whether the automatically initiated communication session satisfies a predetermined business guideline; and notify the at least one participant when the automatically initiated communication session does not satisfy a predetermined business guideline.

In accordance with an exemplary embodiment, the processor may be further configured to transcribe, in real-time using the natural language processing, the automatically initiated communication session; determine, by using sentiment analysis and the transcript, at least one client sentiment for the automatically initiated communication session; and associate the determined at least one client sentiment with the automatically initiated communication session.

In accordance with an exemplary embodiment, the at least one client sentiment may include a characteristic that relates to at least one from among a level of satisfaction and a level of interest for a financial product.

In accordance with an exemplary embodiment, the processor may be further configured to implement the natural language processing by using a model that may include at least one from among a machine learning model, a mathematical model, a process model, and a data model.

In accordance with an exemplary embodiment, the at least one communication request may include a request to initiate at least one from among an audio communication, a video communication, and a textual communication.

In accordance with an exemplary embodiment, the information that is associated with the at least one identifier may include data that corresponds to at least one from among a name, a company, a tier, a past interaction, and a scheduled interaction, the scheduled interaction data including a calendar of upcoming events.

In accordance with an exemplary embodiment, the processor may be further configured to automatically compile data from at least one source, the at least one source may include a client database; identify client information for each of the at least one client from the compiled data, the client information may include corresponding contact information; update the at least one graphical element based on the identified client information; and display, via the graphical user interface, the at least one graphical element for the at least one participant.

In accordance with an exemplary embodiment, the at least one graphical element may include a client relationship management interface that is configured to receive an input from the at least one participant to initiate an outbound communication session based on the contact information.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 6 is a caller identifier screen shot that illustrates a graphical user interface that is usable for implementing a method for providing an integrated platform that manages client data for inbound and outbound electronic communications to facilitate effective client interactions, according to an exemplary embodiment.

FIG. 9 is an outbound call screen shot that illustrates a graphical user interface of an order management system that is usable for implementing a method for providing an integrated platform that manages client data for inbound and outbound electronic communications to facilitate effective client interactions, according to an exemplary embodiment.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
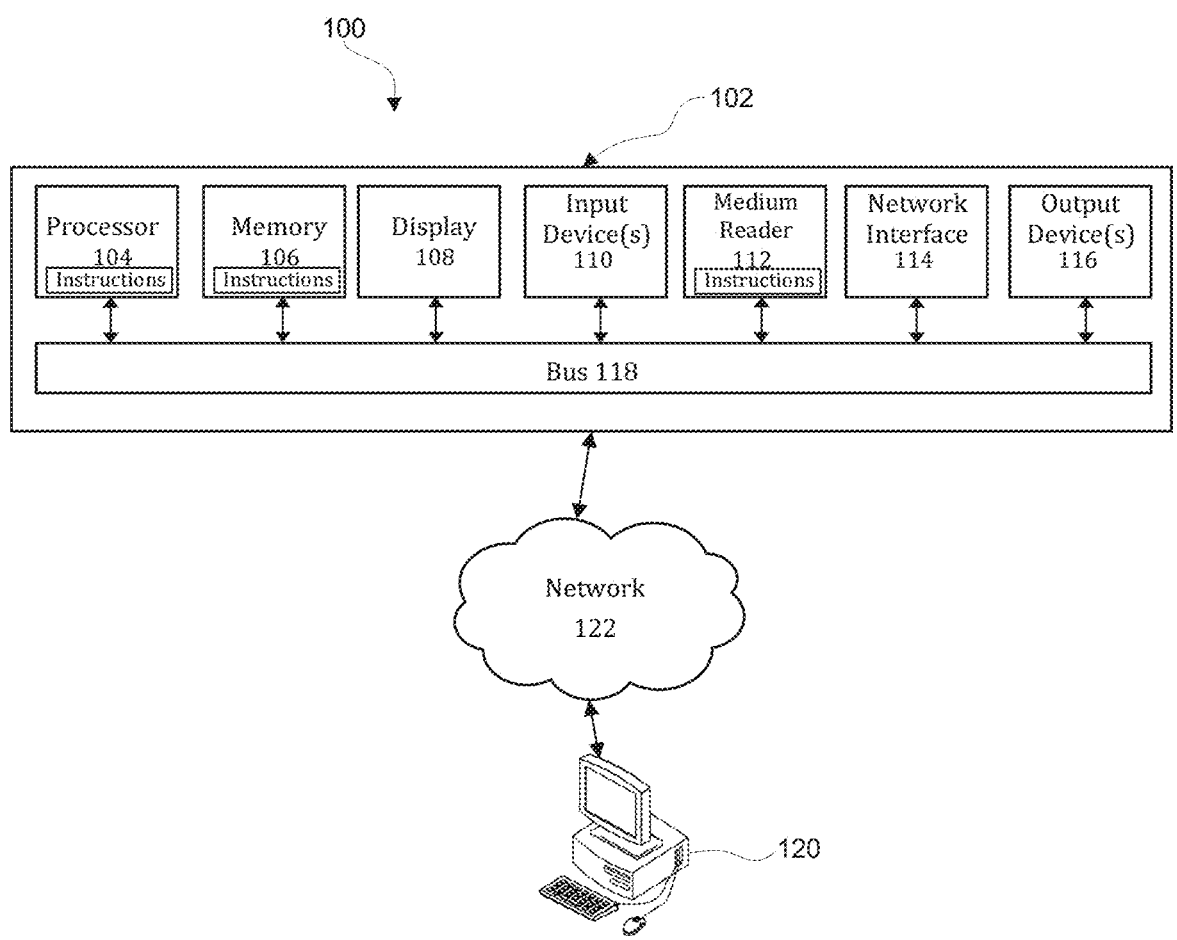
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing an integrated platform that manages client data for inbound and outbound electronic communications to facilitate effective client interactions.

Figure 2:
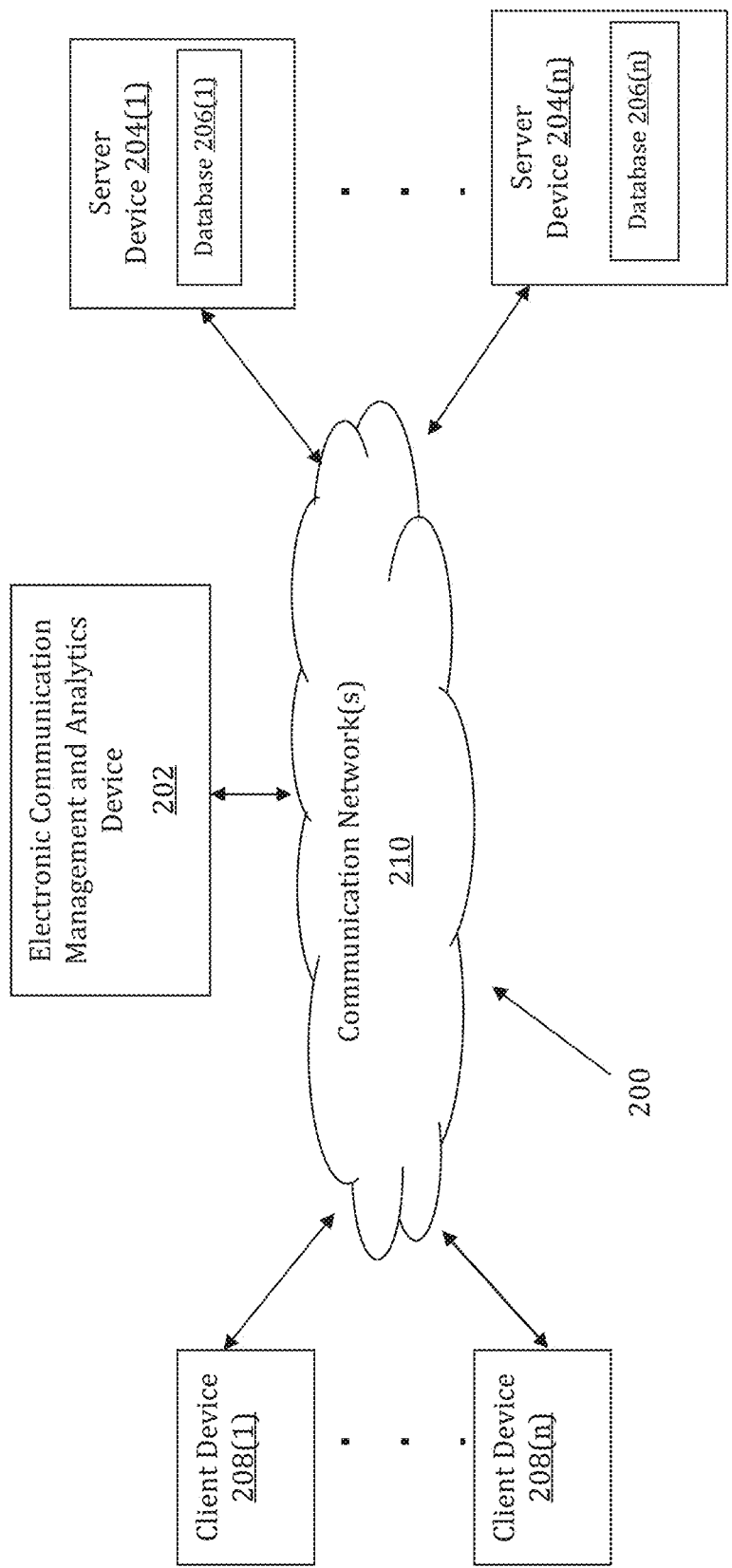
FIG. 2 illustrates an exemplary diagram of a network environment.

Referring to FIG. 2, a schematic of an exemplary network environment 200 for implementing a method for providing an integrated platform that manages client data for inbound and outbound electronic communications to facilitate effective client interactions is illustrated. In an exemplary embodiment, the method is executable on any networked computer platform, such as, for example, a personal computer (PC).

The method for providing an integrated platform that manages client data for inbound and outbound electronic communications to facilitate effective client interactions may be implemented by an Electronic Communication Management and Analytics (ECMA) device 202. The ECMA device 202 may be the same or similar to the computer system 102 as described with respect to FIG. 1. The ECMA device 202 may store one or more applications that can include executable instructions that, when executed by the ECMA device 202, cause the ECMA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ECMA device 202 itself, may be located in virtual server(s) running in a cloud-based computing environment rather than being tied to one or more specific physical network computing devices. Also, the application(s) may be running in one or more virtual machines (VMs) executing on the ECMA device 202. Additionally, in one or more embodiments of this technology, virtual machine(s) running on the ECMA device 202 may be managed or supervised by a hypervisor.

In the network environment 200 of FIG. 2, the ECMA device 202 is coupled to a plurality of server devices 204(1)-204(n) that hosts a plurality of databases 206(1)-206(n), and also to a plurality of client devices 208(1)-208(n) via communication network(s) 210. A communication interface of the ECMA device 202, such as the network interface 114 of the computer system 102 of FIG. 1, operatively couples and communicates between the ECMA device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ECMA device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and ECMA devices that efficiently implement a method for providing an integrated platform that manages client data for inbound and outbound electronic communications to facilitate effective client interactions.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ECMA device 202 may be a standalone device or integrated with one or more other devices or apparatuses, such as one or more of the server devices 204(1)-204(n), for example. In one particular example, the ECMA device 202 may include or be hosted by one of the server devices 204(1)-204(n), and other arrangements are also possible. Moreover, one or more of the devices of the ECMA device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the ECMA device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to communication requests, client identifiers, client information, logs, transcripts, and client sentiments.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the ECMA device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the ECMA device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the ECMA device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ECMA device 202, the server devices 204(1)-204(n), or the client devices 208(1)-208(n), for example, may be configured to operate as virtual instances on the same physical machine. In other words, one or more of the ECMA device 202, the server devices 204(1)-204(n), or the client devices 208(1)-208(n) may operate on the same physical device rather than as separate devices communicating through communication network(s) 210. Additionally, there may be more or fewer ECMA devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
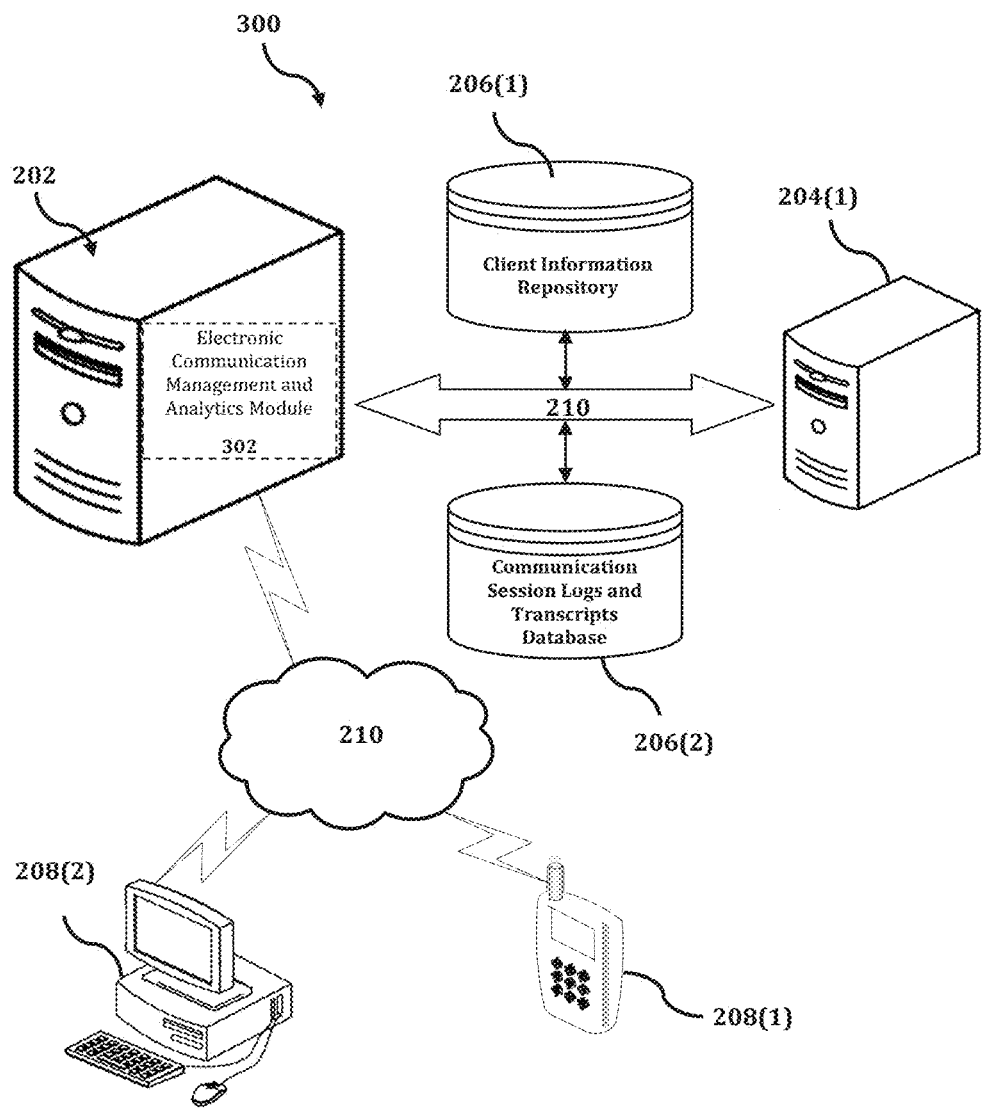
FIG. 3 shows an exemplary system for implementing a method for providing an integrated platform that manages client data for inbound and outbound electronic communications to facilitate effective client interactions.

The ECMA device 202 is described and shown in FIG. 3 as including an electronic communication management and analytics module 302, although it may include other rules, policies, modules, databases, or applications, for example.

As will be described below, the electronic communication management and analytics module 302 is configured to implement a method for providing an integrated platform that manages client data for inbound and outbound electronic communications to facilitate effective client interactions.

An exemplary process 300 for implementing a mechanism for providing an integrated platform that manages client data for inbound and outbound electronic communications to facilitate effective client interactions by utilizing the network environment of FIG. 2 is shown as being executed in FIG. 3. Specifically, a first client device 208(1) and a second client device 208(2) are illustrated as being in communication with ECMA device 202. In this regard, the first client device 208(1) and the second client device 208(2) may be "clients" of the ECMA device 202 and are described herein as such. Nevertheless, it is to be known and understood that the first client device 208(1) and/or the second client device 208(2) need not necessarily be "clients" of the ECMA device 202, or any entity described in association therewith herein. Any additional or alternative relationship may exist between either or both of the first client device 208(1) and the second client device 208(2) and the ECMA device 202, or no relationship may exist.

Further, ECMA device 202 is illustrated as being able to access a client information repository 206(1) and a communication session logs and transcripts database 206(2). The electronic communication management and analytics module 302 may be configured to access these databases for implementing a method for providing an integrated platform that manages client data for inbound and outbound electronic communications to facilitate effective client interactions.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the ECMA device 202 via broadband or cellular communication. Of course, these embodiments are merely exemplary and are not limiting or exhaustive.

Upon being started, the electronic communication management and analytics module 302 executes a process for providing an integrated platform that manages client data for inbound and outbound electronic communications to facilitate effective client interactions. An exemplary process for providing an integrated platform that manages client data for inbound and outbound electronic communications to facilitate effective client interactions is generally indicated at flowchart 400 in FIG. 4.

Figure 4:
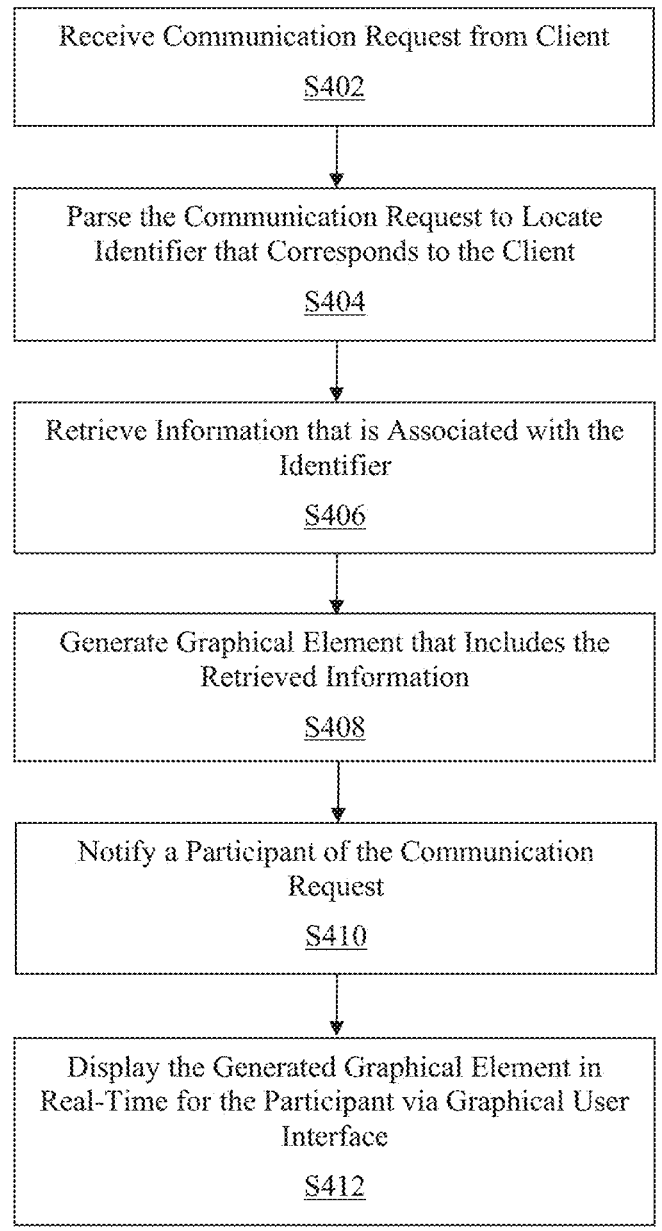
FIG. 4 is a flowchart of an exemplary process for implementing a method for providing an integrated platform that manages client data for inbound and outbound electronic communications to facilitate effective client interactions.

In the process 400 of FIG. 4, at step S402, a communication request may be received from a client. The communication request may relate to a request to initiate a communication session with a participant. In an exemplary embodiment, the communication request may include a request to initiate at least one from among an audio communication, a video communication, and a textual communication. The audio communication request may correspond to at least one from among a telephone call and a voice over internet protocol call. In another exemplary embodiment, the audio communication request may be translated consistent with disclosures in the present application to enable telephone system agnostic communication requests.

The textual communication request may correspond to at least one from among an email message, a text message via a text messaging service such as, for example, a short message service (SMS) and a multimedia messaging service (MMS), as well as a chat message via a messaging service such as, for example, a rich communication service (RCS). The video communication request may correspond to a video teleconferencing call. In another exemplary embodiment, the video teleconferencing call may correspond to a communication request that is started by using a first-party video conferencing platform as well as a third-party video conferencing platform such as, for example, ZOOM and MICROSOFT TEAMS.

In another exemplary embodiment, the participant may correspond to an employee of a business entity as well as an automated client interaction platform. The automated client interaction platform may include an indirect client interaction system and a direct client interaction system. In another exemplary embodiment, the indirect client interaction system may relate to an automated system that is designed to passively engage with the client. For example, an automated call routing system may passively route a call from the client based on a dialed extension. In another exemplary embodiment, the direct client interaction system may relate to an automated system that is designed to actively engage with the client. For example, a chat platform that utilizes artificial intelligence may actively engage with the client to provide customer service.

At step S404, the communication request may be parsed to locate an identifier that corresponds to the client. In an exemplary embodiment, the identifier may relate to a sequence of characters that are used to identify the client. The sequence of characters may include any combination of numeric, alphabetic, and symbolic texts. For example, for a telephone call from the client, the identifier may include a telephone number of the client. Similarly, for a video teleconferencing call from the client, the identifier may include login information of the client. In another exemplary embodiment, a format of the communication request may be identified in advance to facilitate the parsing actions. For example, when the communication request is identified as a text message, a corresponding parsing service such as a natural language processing service may be used to facilitate the parsing.

At step S406, information that is associated with the identifier may be retrieved in real-time. In an exemplary embodiment, the information that is associated with the identifier may include data that corresponds to at least one from among a name, a company, a tier, a past interaction, and a scheduled interaction. The information may also include portfolio data such as, for example, financial instrument data, trade data, revenue data, and indication of interest data. The scheduled interaction data may include a calendar of upcoming events. In another exemplary embodiment, the information may be retrieved in real-time from a networked repository. The networked repository may correspond to a repository operating on a similar data platform as well as a repository that is operating on a different data platform. As will be appreciated by a person of ordinary skill in the art, information retrieved from a networked repository that is operating on a different data platform may be translated into a compatible format prior to utilization.

At step S408, a graphical element may be generated. The graphical element may include the retrieved information. In an exemplary embodiment, the graphical element may also include backgrounds, banners, glass, aggregators, separators, shadows, and handles. The graphical element may be utilized to illustrate relationships, hierarchy, as well as provide visual emphasis. In another exemplary embodiment, the graphical element may be used to organize the retrieved information. For example, a segmented popup window may be used to organize pertinent information about the client such as research readership information, next meeting information, and last interaction information.

In another exemplary embodiment, a plurality of graphical elements may be generated based on the retrieved information. For example, a plurality of graphical elements may be required for a client such as a corporate client with more than one points of contact. In another exemplary embodiment, the graphical element may include a client relationship management interface that is configured to receive an input from the participant to initiate an outbound communication session based on contact information of the client.

At step S410, the participant of the communication request may be notified. In an exemplary embodiment, an alert for the participant of the communication request may be generated. The alert may include information relating to the communication request. For example, the alert may include the name of the client and that the client would like to initiate a communication session via a particular video teleconferencing application. In another exemplary embodiment, the alert may include interactive graphical components that are configured to receive an input from the participant. For example, the alert may include a graphical button to accept the teleconferencing call, a graphical button to decline the teleconferencing call, and a more information button to display additional information relating to the communication request and the client.

At step S412, the generated graphical element may be displayed in real-time for the participant via a graphical user interface. In an exemplary embodiment, the generated graphical element may be displayed on the graphical user interface based on an indication from the participant that is received via the alert notification. For example, the generated graphical element may be displayed in response to an indication by the participant that additional client information is desired and/or the communication request is accepted. In another exemplary embodiment, the graphical user interface may correspond to a visual technique for interacting with a computer that utilizes items such as, for example, windows, icons, and menus. The graphical user interface may include a dashboard that provides a graphical summary of various pieces of pertinent information.

In another exemplary embodiment, an indication may be received from the participant via the graphical user interface. The indication may correspond to an acceptance of the at least one communication request. Then, the communication session may be automatically initiated based on a parameter from the communication request. In another exemplary embodiment, the parameter may correspond to a client's desired communication session. For example, for a communication request that is made via a text message, the parameter may include a textual indication that a communication session via a video teleconferencing application is desired.

In another exemplary embodiment, the communication request together with session information that corresponds to the automatically initiated communication session may be logged. The communication request together with session information may be logged in real time by using natural language processing techniques. In another exemplary embodiment, whether the automatically initiated communication session satisfies a predetermined business guideline may be determined by using the corresponding log. The predetermined business guideline may include regulatory requirements such as, for example, cross border requirements as well as business requirements such as, for example, client coverage requirements. In another exemplary embodiment, the participant may be notified consistent with disclosures in the present application when the automatically initiated communication session does not satisfy the predetermined business guideline.

In another exemplary embodiment, the automatically initiated communication session may be transcribed. The automatically initiated communication session may be transcribed in real-time by using natural language processing. A resulting transcript may be associated with the automatically initiated communication session. In another exemplary embodiment, a client sentiment may be determined by using sentiment analysis and the resulting transcript. The client sentiment may be determined for the automatically initiated communication session consistent with disclosures in the present application. The client sentiment may be represented as a value that relates to at least one from among a sentiment score and a sentiment level.

In another exemplary embodiment, the client sentiment may be represented by a characteristic of the sentiment. For example, the characteristic of the client sentiment may indicate that the client is pleased during the automatically initiated communication session. In another exemplary embodiment, the client sentiment may include a characteristic that relates to at least one from among a level of satisfaction and a level of interest for a financial product. For example, in an automatically initiated communication session regarding financial product C, a satisfied client sentiment may indicate an interest in financial product C. Likewise, a level of interest in financial product C may be determined based on the detected characteristic. Then, the determined client sentiment may be associated with the automatically initiated communication session for persisting in a networked repository. In another exemplary embodiment, a suggested client interaction for a future communication session may be determined based on the client sentiment.

In another exemplary embodiment, the natural language processing may be implemented by using a model that includes at least one from among a machine learning model, a mathematical model, a process model, and a data model. The model may also include stochastic models such as, for example, a Markov model that is used to model randomly changing systems. In stochastic models, the future states of a system may be assumed to depend only on the current state of the system.

In another exemplary embodiment, machine learning and pattern recognition may include supervised learning algorithms such as, for example, k-medoids analysis, regression analysis, decision tree analysis, random forest analysis, k-nearest neighbors analysis, logistic regression analysis, etc. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, etc.

In another exemplary embodiment, the model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

In another exemplary embodiment, data from a source may be automatically compiled. The source may include a client database that is implemented on a variety of different data platforms. For example, a client database may be implemented on a sales focused data platform as well as a marketing focused data platform. Similarly, the client database may be implemented on a first-party data platform as well as a third-party data platform. In another exemplary embodiment, client information for each client may be identified from the automatically compiled data. The client information may include corresponding contact information. In another exemplary embodiment, the graphical element may be updated based on the identified client information. Then, the updated graphical element may be displayed for the participant via the graphical user interface. In another exemplary embodiment, the graphical element may include a client relationship management interface that is configured to receive an input from the participant to initiate an outbound communication session based on the contact information.

Figure 5:
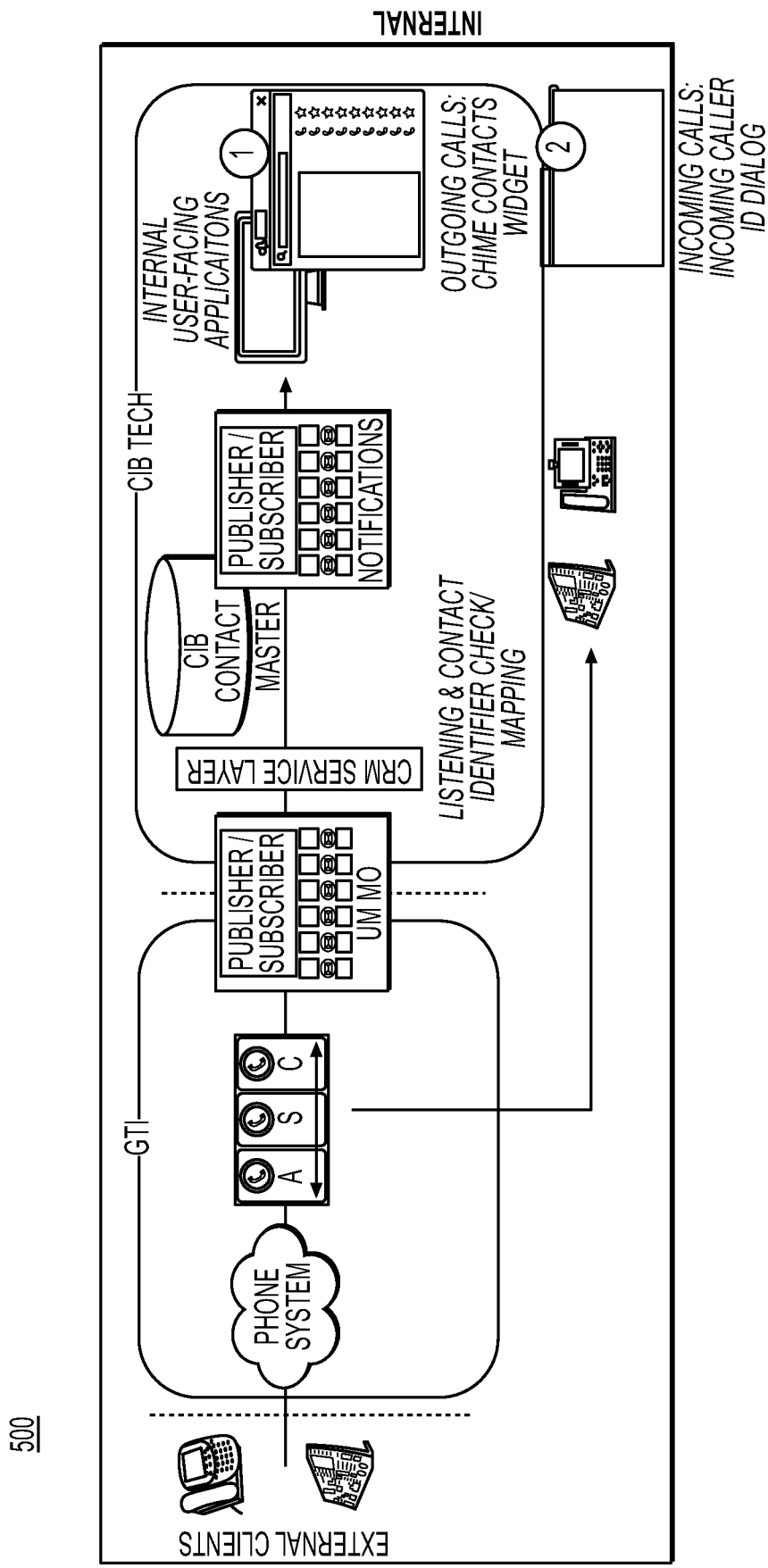
FIG. 5 is an architectural diagram of an exemplary process for implementing a method for providing an integrated platform that manages client data for inbound and outbound electronic communications to facilitate effective client interactions.

FIG. 5 is an architectural diagram 500 of an exemplary process for implementing a method for providing an integrated platform that manages client data for inbound and outbound electronic communications to facilitate effective client interactions. In FIG. 5, points of integration are provided to integrate components to a new framework that facilitates sophisticated intelligence at the time of call.

As illustrated in FIG. 5, the first point of integration may correspond to outbound calls to external clients. For outbound calls, a contacts widget may be implemented to listen to client interaction systems and return relevant client information. The contacts widget may support searching across a master contact database. Additionally, the contacts widget may enable editing and creating new contacts in the master contact database.

The second point of integration may correspond to inbound calls from external clients. For inbound calls, a caller identifier messages component may serve as an air-traffic-controller that publishes contact identifiers, client information, and call events. Clients may subscribe to the caller identifier messages component to facilitate automated contact and client information population.

FIG. 6 is a caller identifier screen shot 600 that illustrates a graphical user interface that is usable for implementing a method for providing an integrated platform that manages client data for inbound and outbound electronic communications to facilitate effective client interactions, according to an exemplary embodiment. In FIG. 6, the graphical user interface may be presented to a participant of the communication session.

As illustrated in FIG. 6, the graphical user interface may include client information such as, for example, research readership information, next meeting information, and last interaction information that have been automatically provided for the participant. The graphical user interface may also include a graphical element that is configured to receive call notes from the participant to log together with the communication session. The log may include peripheral data relating to the communication session such as, for example, a call duration time.

Figure 7:
FIG. 7 is a call history screen shot that illustrates a graphical user interface that is usable for implementing a method for providing an integrated platform that manages client data for inbound and outbound electronic communications to facilitate effective client interactions, according to an exemplary embodiment.

FIG. 7 is a call history screen shot 700 that illustrates a graphical user interface that is usable for implementing a method for providing an integrated platform that manages client data for inbound and outbound electronic communications to facilitate effective client interactions, according to an exemplary embodiment. In FIG. 7, the graphical user interface may be presented to a participant of the communication session.

As illustrated in FIG. 7, the graphical user interface may include a historical overview of calls received by the participant as well as calls that were missed. The graphical user interface may include client information such as, for example, a job title and an associated company for each of the missed calls. The graphical user interface may include a graphical element that is configured to receive contact information from the participant for unknown contacts. Consistent with disclosures in the present application, the participant has the option to create a new contact entry in the master contact database for the unknown contacts.

Figure 8:
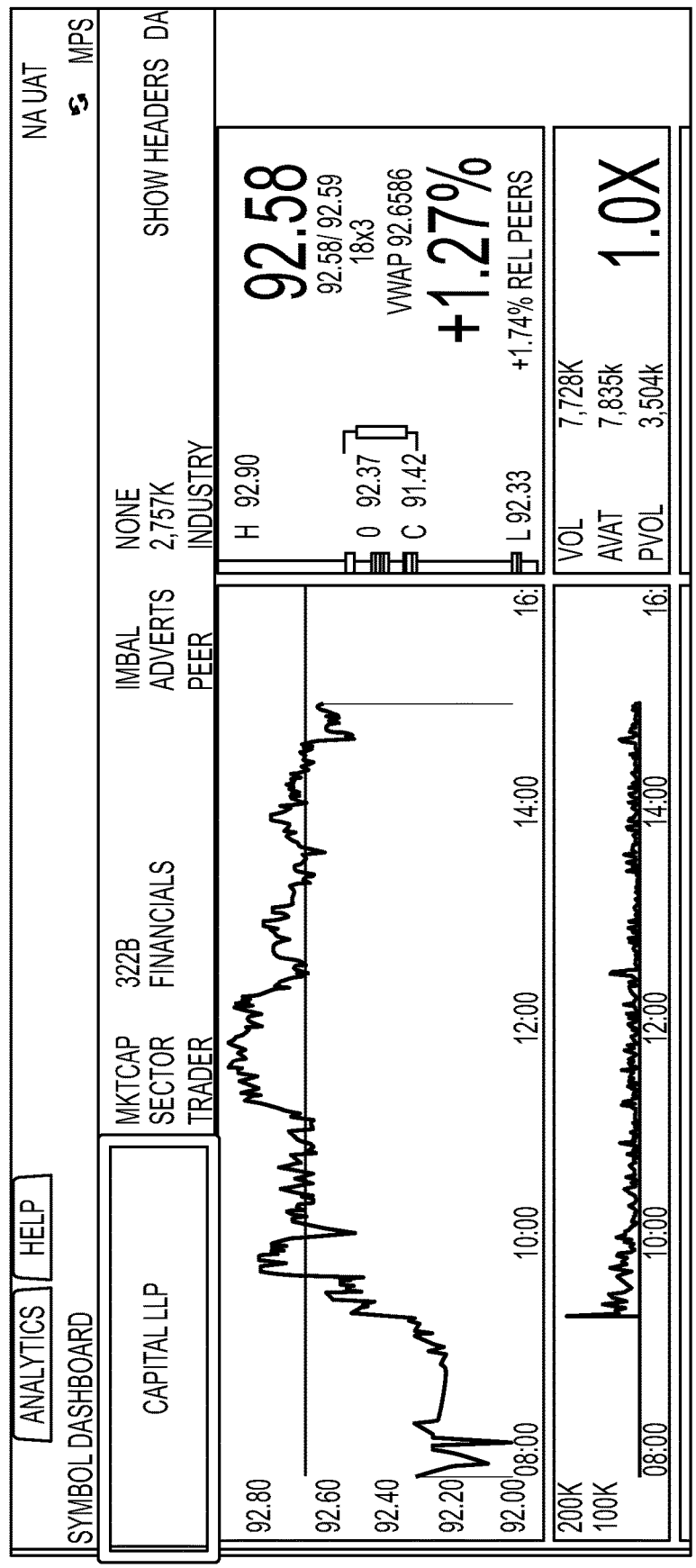
FIG. 8 is an inbound call screen shot that illustrates a graphical user interface of an order management system that is usable for implementing a method for providing an integrated platform that manages client data for inbound and outbound electronic communications to facilitate effective client interactions, according to an exemplary embodiment.

FIG. 8 is an inbound call screen shot 800 that illustrates a graphical user interface of an order management system that is usable for implementing a method for providing an integrated platform that manages client data for inbound and outbound electronic communications to facilitate effective client interactions, according to an exemplary embodiment. In FIG. 8, the graphical user interface may be presented to a participant of the communication session.

As illustrated in FIG. 8, the graphical user interface may include relevant client information such as, for example, associated financial information that have been automatically provided for the participant. Consistent with disclosures in the present application, the graphical user interface may correspond to one from among a plurality of client information interfaces that are available for the participant.

Figure 9:
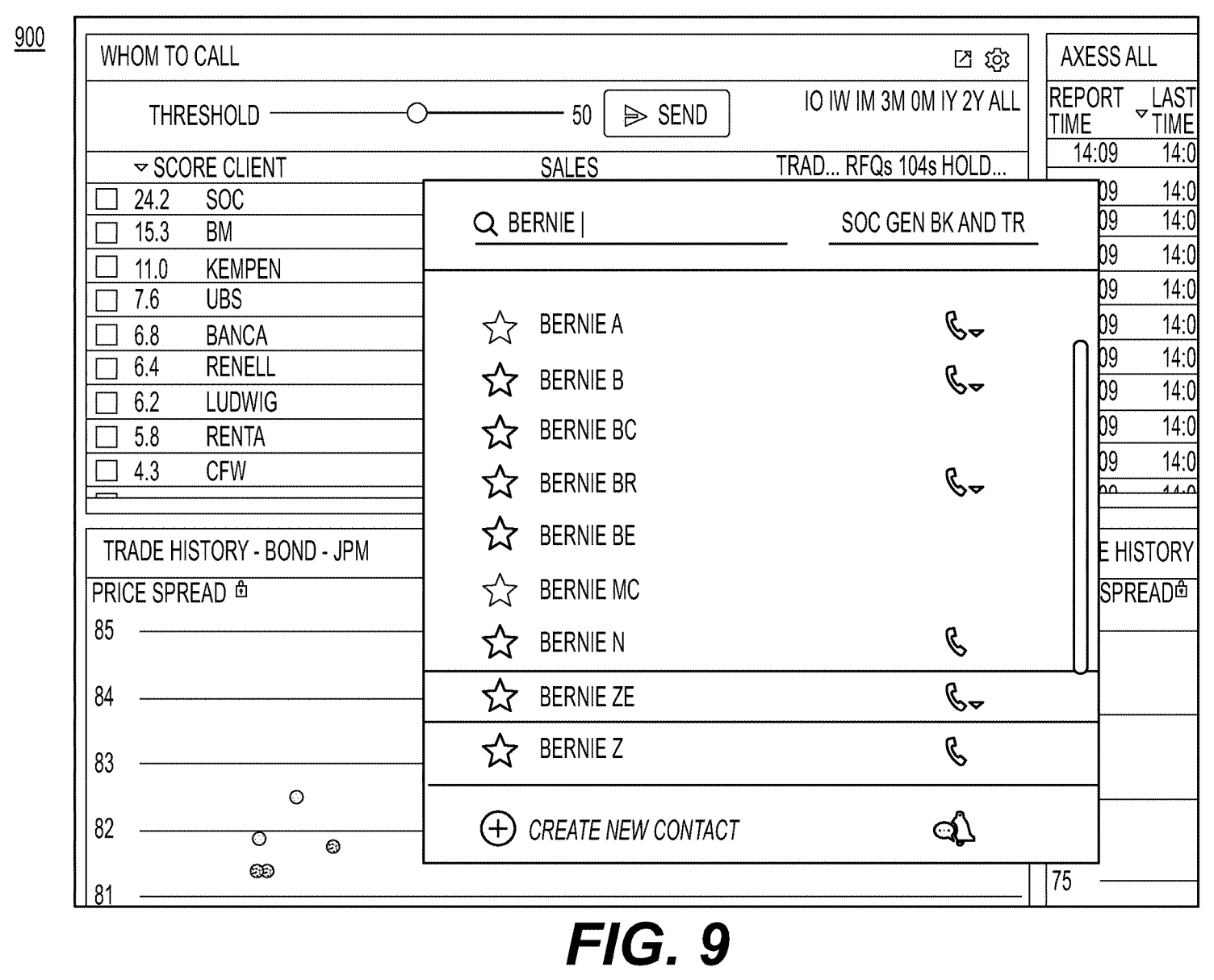

FIG. 9 is an outbound call screen shot 900 that illustrates a graphical user interface of an order management system that is usable for implementing a method for providing an integrated platform that manages client data for inbound and outbound electronic communications to facilitate effective client interactions, according to an exemplary embodiment. In FIG. 8, the graphical user interface may be presented to a participant of the communication session.

As illustrated in FIG. 8, the graphical user interface may include a graphical element that is configured to receive input from the participant to facilitate the searching of a master contact database. The participant may utilize the integrated graphical element to search for a particular contact in the master contact database. The participant may also filter the search result based on user defined criteria such as, for example, an association with the client.

Accordingly, with this technology, an optimized process for providing an integrated platform that manages client data for inbound and outbound electronic communications to facilitate effective client interactions is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing an integrated platform to facilitate electronic communication, the method being implemented by at least one processor, the method comprising:

receiving, by the at least one processor, at least one communication request from at least one client, the at least one communication request relating to a request to initiate a communication session with at least one participant;

parsing, by the at least one processor, the at least one communication request to locate at least one identifier that corresponds to the at least one client;
retrieving, by the at least one processor in real-time, information that is associated with the at least one identifier;
generating, by the at least one processor, at least one graphical element, the at least one graphical element including the retrieved information;
notifying, by the at least one processor, the at least one participant of the at least one communication request;
displaying, by the at least one processor via a graphical user interface, the at least one generated graphical element in real-time for the at least one participant;
receiving, by the at least one processor, an indication from the at least one participant via the graphical user interface, the indication corresponding to an acceptance of the at least one communication request;
automatically initiating, by the at least one processor, the communication session based on at least one parameter from the at least one communication request;
logging, by the at least one processor in real-time using natural language processing, the at least one communication request together with session information that corresponds to the automatically initiated communication session;
determining, by the at least one processor using the log, whether the automatically initiated communication session satisfies a predetermined business guideline; and
notifying, by the at least one processor, the at least one participant when the automatically initiated communication session does not satisfy the predetermined business guideline.

2. The method of claim 1, further comprising:
transcribing, by the at least one processor in real-time using the natural language processing, the automatically initiated communication session;
determining, by the at least one processor using sentiment analysis and the transcript, at least one client sentiment for the automatically initiated communication session; and
associating, by the at least one processor, the determined at least one client sentiment with the automatically initiated communication session.

3. The method of claim 2, wherein the at least one client sentiment includes a characteristic that relates to at least one from among a level of satisfaction and a level of interest for a financial product.

4. The method of claim 2, wherein the natural language processing is implemented by using a model that includes at least one from among a machine learning model, a mathematical model, a process model, and a data model.

5. The method of claim 1, wherein the at least one communication request includes a request to initiate at least one from among an audio communication, a video communication, and a textual communication.

6. The method of claim 1, wherein the information that is associated with the at least one identifier includes data that corresponds to at least one from among a name, a company, a tier, a past interaction, and a scheduled interaction, the scheduled interaction data including a calendar of upcoming events.

7. The method of claim 1, further comprising:
automatically compiling, by the at least one processor, data from at least one source, the at least one source including a client database;
identifying, by the at least one processor, client information for each of the at least one client from the compiled data, the client information including corresponding contact information;
updating, by the at least one processor, the at least one graphical element based on the identified client information; and
displaying, by the at least one processor via the graphical user interface, the at least one graphical element for the at least one participant.

8. The method of claim 7, wherein the at least one graphical element includes a client relationship management interface that is configured to receive an input from the at least one participant to initiate an outbound communication session based on the contact information.

9. A computing device configured to implement an execution of a method for providing an integrated platform to facilitate electronic communication, the computing device comprising:
a processor;
a memory; and
a communication interface coupled to each of the processor and the memory,
wherein the processor is configured to:
receive at least one communication request from at least one client, the at least one communication request relating to a request to initiate a communication session with at least one participant;
parse the at least one communication request to locate at least one identifier that corresponds to the at least one client;
retrieve, in real-time, information that is associated with the at least one identifier;
generate at least one graphical element, the at least one graphical element including the retrieved information;
notify the at least one participant of the at least one communication request;
display, via a graphical user interface, the at least one generated graphical element in real-time for the at least one participant;
receive an indication from the at least one participant via the graphical user interface, the indication corresponding to an acceptance of the at least one communication request;
automatically initiate the communication session based on at least one parameter from the at least one communication request;
log, in real-time using natural language processing, the at least one communication request together with session information that corresponds to the automatically initiated communication session;
determine, by using the log, whether the automatically initiated communication session satisfies a predetermined business guideline; and
notify the at least one participant when the automatically initiated communication session does not satisfy the predetermined business guideline.

10. The computing device of claim 9, wherein the processor is further configured to:
transcribe, in real-time using the natural language processing, the automatically initiated communication session;
determine, by using sentiment analysis and the transcript, at least one client sentiment for the automatically initiated communication session; and associate the determined at least one client sentiment with the automatically initiated communication session.

11. The computing device of claim 10, wherein the at least one client sentiment includes a characteristic that relates to at least one from among a level of satisfaction and a level of interest for a financial product.

12. The computing device of claim 10, wherein the processor is further configured to implement the natural language processing by using a model that includes at least one from among a machine learning model, a mathematical model, a process model, and a data model.

13. The computing device of claim 9, wherein the at least one communication request includes a request to initiate at least one from among an audio communication, a video communication, and a textual communication.

14. The computing device of claim 9, wherein the information that is associated with the at least one identifier includes data that corresponds to at least one from among a name, a company, a tier, a past interaction, and a scheduled interaction, the scheduled interaction data including a calendar of upcoming events.

15. The computing device of claim 9, wherein the processor is further configured to:
   automatically compile data from at least one source, the at least one source including a client database;
   identify client information for each of the at least one client from the compiled data, the client information including corresponding contact information;
   update the at least one graphical element based on the identified client information; and
   display, via the graphical user interface, the at least one graphical element for the at least one participant.

16. The computing device of claim 15, wherein the at least one graphical element includes a client relationship management interface that is configured to receive an input from the at least one participant to initiate an outbound communication session based on the contact information.

* * * * *